United States Patent
PAtil et al.

(10) Patent No.: US 12,511,608 B2
(45) Date of Patent: Dec. 30, 2025

(54) SYSTEM AND METHOD FOR ADDRESS VERIFICATION

(71) Applicant: DoorDash, inc., San Francisco, CA (US)

(72) Inventors: Aniket PAtil, Milpitas, CA (US); Eliott Gray, Berkeley, CA (US); Anthony Forlin, Seattle, WA (US); Lipeng Peng, Oakland, CA (US); Jenna Kiyasu, Daly City, CA (US); Sara Panitz-Franceschini, Ridgefield, CT (US); Stephanie Wing See Chiu, Toronto (CA); Deepthi Brundavanam, Sunnyvale, CA (US)

(73) Assignee: DoorDash, Inc., San Francisco, CA (US)

( * ) Notice: Subject to any disclaimer, the term of this patent is extended or adjusted under 35 U.S.C. 154(b) by 0 days.

(21) Appl. No.: 18/332,656

(22) Filed: Jun. 9, 2023

(65) Prior Publication Data
US 2023/0401527 A1    Dec. 14, 2023

Related U.S. Application Data

(60) Provisional application No. 63/351,265, filed on Jun. 10, 2022.

(51) Int. Cl.
*G06Q 10/083*    (2024.01)
*G06Q 10/0835*   (2023.01)

(52) U.S. Cl.
CPC .............. *G06Q 10/08355* (2013.01)

(58) Field of Classification Search
None
See application file for complete search history.

(56) References Cited

U.S. PATENT DOCUMENTS

| | | | |
|---|---|---|---|
| 6,384,850 B1 | 5/2002 | McNally et al. |
| 6,871,325 B1 | 3/2005 | McNally et al. |
| 6,982,733 B1 | 1/2006 | McNally et al. |
| 8,146,077 B2 | 3/2012 | McNally et al. |
| 9,009,060 B2 | 4/2015 | McNally |
| 9,747,651 B2 | 8/2017 | McNally |

(Continued)

FOREIGN PATENT DOCUMENTS

WO    0122289 A1    3/2001

OTHER PUBLICATIONS

Liying Song, Alternative Solution for Addressing Failed Home Deliveries, 2012 (Year: 2012).*

(Continued)

*Primary Examiner* — Ismail A Manejwala
(74) *Attorney, Agent, or Firm* — Kilpatrick Townsend & Stockton LLP

(57) ABSTRACT

A method includes a server computer receiving delivery data associated with a plurality of deliveries in a geographical area. The server computer can determine a plurality of adverse delivery zones in the geographical area. The server computer can receive a fulfillment request to deliver an item to an end user at a specific location and determine if the specific location is in one of the adverse delivery zones. If the specific location is in one of the adverse delivery zones, the server computer can take one or more additional actions to ensure that the item is delivered to the end user at the specific location.

14 Claims, 7 Drawing Sheets

(56) References Cited

U.S. PATENT DOCUMENTS

| | | | |
|---|---|---|---|
| 10,970,797 | B2 | 4/2021 | McNally |
| 11,276,130 | B2 | 3/2022 | McNally |
| 11,842,415 | B2 | 12/2023 | McNally |
| 11,847,587 | B1 | 12/2023 | McNally |
| 11,861,546 | B1* | 1/2024 | Wang ................. G06Q 10/0832 |
| 2014/0249937 | A1 | 9/2014 | McNally |
| 2021/0065114 | A1* | 3/2021 | Thompson ......... G06Q 10/1093 |
| 2022/0210621 | A1* | 6/2022 | Sankaran ................ H04W 4/35 |
| 2023/0199512 | A1* | 6/2023 | Guill, Jr. .............. H04W 24/08 370/254 |

OTHER PUBLICATIONS

"He: Hexagonal hierarchical geospatial indexing system", downloaded Platform on Jun. 4, 2024 from https://h3geo.org/, 2 pages.

"Geocoding Request and Response", downloaded from Google Maps Platform on Jun. 4, 2024 from https://developers.google.com/maps/docum eocoding/requests-geocoding, 28 pages.

"Place Autocomplete", downloaded from Google Maps Platform on Jun. 4, 2024 from https://developers.google.com/maps/documentation/places/web-service/autocomplete, 18 pages.

"Geocoding request and response", downloaded from Google Maps Platform on Jun. 4, 2024 from https://developers.google.com/maps/documentation/geocoding/requests-geocoding, 28 pages.

"Place Details API", downloaded from Google Maps Platform on Jun. 4, 2024 from https://developers.google.com/maps/documentation/places/web-service/details, 18 pages.

"US Street Address API", downloaded Jun. 4, 2024, from https://www.smarty.com/docs/cloud/US-street-api, 51 pages.

"Verify International Addresses" downloaded Jun. 4, 2024, from https://www.smarty.com/docs/cloud/international-street-api, 137 pages.

Civil Action No. 2:23-CV-2165-WSH, Amended Complaint for Patent Infringement—*Ameranth, Inc.*, Plaintiff, V. *Doordash, Inc.*, Eat'n Park Restaurants, LLC, and Eat'n Park Hospitality Group, Inc., Defendants, Sep. 17, 2024, pp. 1-91.

Unpublished U.S. Appl. No. 18/145,942, filed Dec. 23, 2022.

* cited by examiner

400

DELIVERY ADDRESS:
    APARTMENT BUILDING
    123 MAIN STREET
    CITY, STATE 00000

To ensure your order arrives as quickly as possible, please provide additional address details/instructions in the text box below.

SUBMIT

ORDER DETAILS

*FIG. 4*

SYSTEM AND METHOD FOR ADDRESS VERIFICATION

CROSS REFERENCE TO RELATED APPLICATIONS

The present application is a Non-Provisional Application of and claims priority to U.S. Provisional Application 63/351,265, filed on Jun. 10, 2022, which is incorporated herein by reference in its entirety.

BACKGROUND

End users often use websites and other technologies to purchase items from service providers for delivery to the end user. In some instances, a delivery platform may facilitate deliveries for the service providers. For example, a delivery platform may provide an online website that identifies items from multiple service providers that are available for delivery by the delivery platform. An end user may navigate to the online site, select an item from a service provider, specify an address for delivery, and purchase the item for delivery to the end user's address. The delivery platform may then utilize various resources to fulfill delivery of the item to the end user. For example, the delivery platform may communicate with a transporter to retrieve the item from the merchant, and then delivery the item to the end user's address.

In some cases, the end user's address may be vague or may be in an area where transporters have historically had difficulty in locating the end user to complete a delivery. For example, an end user may omit a unit or apartment number in their end user address or a newly constructed building may not yet be mapped by a third-party location services provider. Thus, it may be difficult for a transporter to complete a delivery to an ambiguous address.

Embodiments of the invention address these and other problems individually and collectively.

BRIEF SUMMARY

One embodiment of the invention includes a method comprising: receiving, by a server computer, delivery data associated with a plurality of deliveries in a geographical area; determining, by a server computer, a plurality of adverse delivery zones in the geographical area; receiving, by the server computer, a fulfillment request to deliver an item to an end user at a specific location; determining if the specific location is in one of the adverse delivery zones; and if the specific location is in one of the adverse delivery zones, then taking one or more additional actions to ensure that the item is delivered to the end user at the specific location.

Another embodiment of the invention includes a server computer comprising: a processor; and a computer-readable medium coupled to the processor, the computer-readable medium comprising code executable by the processor for implementing a method comprising: receiving delivery data associated with a plurality of deliveries in a geographical area; determining a plurality of adverse delivery zones in the geographical area; receiving a fulfillment request to deliver an item to an end user at a specific location; determining if the specific location is in one of the adverse delivery zones; and if the specific location is in one of the adverse delivery zones, then taking one or more additional actions to ensure that the item is delivered to the end user at the specific location.

Another embodiment of the invention includes a system comprising: one or more transporter user devices; an end user device; and a server computer comprising: a first computer-readable medium coupled to the first processor, the first computer-readable medium comprising code executable by the first processor for implementing a method comprising: receiving delivery data associated with a plurality of deliveries in a geographical area; determining a plurality of adverse delivery zones in the geographical area; receiving, from the end user device, a fulfillment request to deliver an item to an end user at a specific location; providing the fulfillment request to the one or more transporter user devices, wherein the one or more transporter user devices determine whether or not to accept the fulfillment request; receiving an acceptance message from a transporter user device of the one or more transporter user devices; determining if the specific location is in one of the adverse delivery zones; if the specific location is in one of the adverse delivery zones, then prompting the end user to request additional information about the specific location or how to travel to the specific location; receiving, form the end user device, additional information associated with the specific location; and providing, to the transporter user device, the additional information. Further details regarding these and other embodiments can be found in the Detailed Description and the Figures.

BRIEF DESCRIPTION OF THE DRAWINGS

FIG. 4 shows an exemplary graphical user interface (GUI) for receiving address information from an end user according to embodiments.

DETAILED DESCRIPTION

Figure 1:
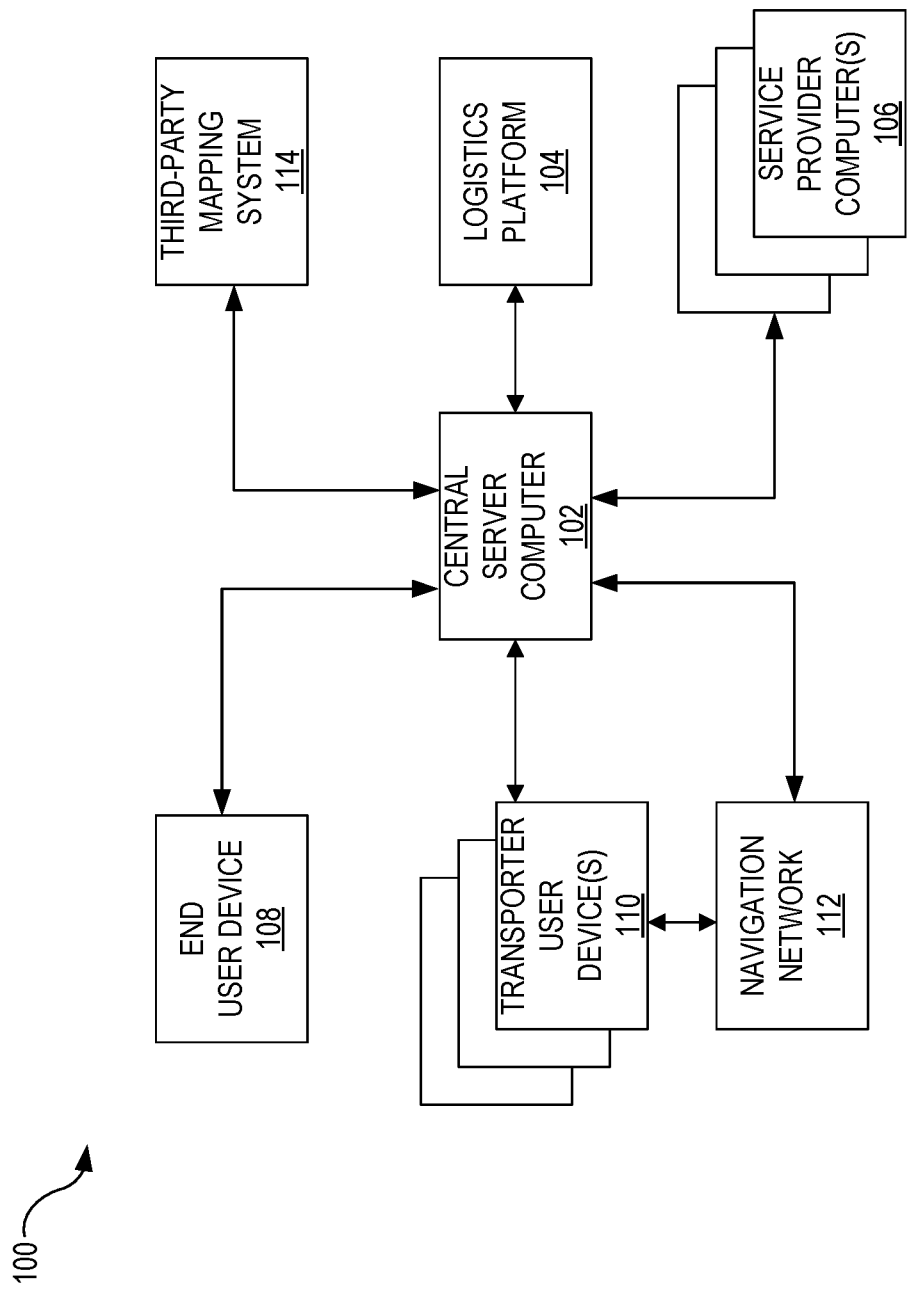
FIG. 1 shows a block diagram of a system for address verification according to embodiments.

Prior to discussing embodiments of the invention, some terms can be described in further detail.

A "user" may include an individual or a computational device. In some embodiments, an end user may be associated with one or more personal accounts and/or user devices.

A "user device" may be any suitable electronic device that can process and communicate information to other electronic devices. The user device may include a processor and a computer-readable medium coupled to the processor, the computer-readable medium comprising code, executable by the processor. The user device may also each include an external communication interface for communicating with each other and other entities. Examples of user devices may include a mobile device (e.g., a mobile phone), a laptop or desktop computer, a wearable device (e.g., smartwatch), etc.

A "transporter" can be an entity that transports something. A transporter can be a person that transports a resource using a transportation device (e.g., a car). In other embodiments, a transporter can be a transportation device that may or may not be operated by a human. Examples of transportation devices include autonomous vehicles, cars, boats, scooters, bicycles, drones, airplanes, etc.

A "fulfillment request" can be a request to provide a resource in response to a request. For example, a fulfillment request can include an initial communication from an end user device to a central server computer for a first service provider computer to fulfill a purchase request for a resource such as food. A fulfillment request can be in an initial state, a comprising data completed state, or a final state. After the fulfillment request is in a final state, it can be accepted by the central server computer, and the central server computer can send a fulfillment request confirmation to the end user device. A fulfillment request can include one or more selected items from a selected service provider. A fulfillment request can also include user features of the end user providing the fulfillment request.

An "item" can include an individual article or unit. An item can be a thing that is provided by a service provider. Items can be a goods. For example, an item can be a bowl of soup, a soda can, a toy, clothing, etc. An item can be a thing that is delivered from a service provider location to an end user location by a transporter.

The term "artificial intelligence model" or "AI model" can include a model that may be used to predict outcomes in order achieve a pre-defined goal. The AI model may be developed using a learning algorithm, in which training data is classified based on known or inferred patterns. An AI model may also be referred to as a "machine learning model" or "predictive model."

"Machine learning" can include an artificial intelligence process in which software applications may be trained to make accurate predictions through learning. The predictions can be generated by applying input data to a predictive model formed from performing statistical analyses on aggregated data. A model can be trained using training data, such that the model may be used to make accurate predictions. The prediction can be, for example, a classification of an image (e.g., identifying images of cats on the Internet) or as another example, a recommendation (e.g., a movie that a user may like or a restaurant that an end user might enjoy).

In some embodiments, a model may be a statistical model, which can be used to predict unknown information from known information. For example, a learning module may be a set of instructions for generating a regression line from training data (supervised learning) or a set of instructions for grouping data into clusters of different classifications of data based on similarity, connectivity, and/or distance between data points (unsupervised learning). The regression line or data clusters can then be used as a model for predicting unknown information from known information. Once model has been built from learning module, the model may be used to generate a predicted output from a new request. A new request may be a request for a prediction associated with presented data. For example, a new request may be a request for classifying an image or for creating a recommendation for a user.

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on feature vectors or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines (SVM), models that classify data by establishing a gap or boundary between inputs of different classifications, as well as neural networks, collections of artificial "neurons" that perform functions by activating in response to inputs.

A "feature" can be an individual measurable property or characteristic of a phenomenon. A feature can be described by a feature vector. A feature can be input into a model to determine an output. As an example, in pattern recognition and machine learning, a feature vector is an n-dimensional vector of numerical features that represent some object. Algorithms in machine learning require a numerical representation of objects since such representations facilitate processing and statistical analysis. When representing images, the feature values might correspond to the pixels of an image. When representing text, however, the features might be the frequencies of occurrence of textual terms. Feature vectors are equivalent to the vectors of explanatory variables used in statistical procedures such as linear regression. Feature vectors can be combined with weights using a dot product in order to construct a linear predictor function that is used to determine a score for making a prediction.

A "server computer" can include a powerful computer or cluster of computers. For example, the server computer can be a large mainframe, a minicomputer cluster, or a group of servers functioning as a unit. In one example, the server computer may be a database server coupled to a Web server. A server computer can also include a cloud computer.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" can include any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Embodiments relate to systems and methods for address verification. A central server computer can operate and maintain a platform (e.g., a delivery platform). A central server computer can receive delivery data associated with deliveries in a geographical area.

The central server computer can determine adverse delivery zones in the geographical area. An adverse delivery zone can refer to a geographical area within which it is difficult for a transporter to complete a delivery. In some examples adverse delivery zones may be determined using machine learning methods or a machine learning model trained on historical delivery data and geographic data. An adverse delivery zone may be associated with a failure parameter, such as a rate of failed deliveries, amount of time in the zone spent by the transporter, or number of communications between the transporter and the end user. When the failure parameter reaches a particular threshold, the geographic area can be considered an adverse delivery zone. A delivery failure can relate to a delivery that did not occur as intended, or that occurred a predetermined amount of time after an expected amount of time for that delivery. For example, in the latter case, if the delivery of an item (e.g., food) that is time sensitive from service provider A located at location A to an end user at location B is expected to occur within 20 minutes, and the delivery took more than 150 percent of the expected delivery time (e.g., 30 minutes), then that delivery may be considered a failed delivery even though the delivery was eventually made.

The central server computer can receive a fulfillment request to deliver an item to an end user at a specific location and determine if the specific location is in one of the adverse delivery zones. In some aspects, the central server computer can map the specific location or an approximation of a specific location to a geographic area to determine whether the specific location is in an adverse delivery zone.

If the specific location is in one of the adverse delivery zones, the central server computer can take one or more additional actions to ensure that the item is delivered to the end user at the specific location. For example, the central server computer can cause an end user device to display a GUI configured to prompt the end user to enter additional address or location information. In another example, the central computer server may query a database to retrieve previously submitted additional information. The additional address or location information may then be provided to the transporter via a GUI of the transporter device to facilitate seamless completion of the delivery.

In some examples, the central server computer may obtain data, such as geographic data, location data, or delivery data, from transporter user devices. The central server computer can include the data from the transporter user devices into a dataset configured to store historical and real-time information associated with deliveries to end users. The central server computer can extract one or more features from the dataset and train a machine learning model using training data based on the one or more features. Subsequently, the central server computer can determine updated adverse delivery zones using the trained machine learning model.

FIG. 1 shows block diagram of a system 100 according to embodiments. The system 100 includes a central server computer 102, a logistics platform 104, one or more service provider computers 106, an end user device 108, a transporter user device 110, a navigation network 112, and a third-party mapping system 114.

The central server computer 102 can be in operative communication with the logistics platform 104, the one or more service provider computers 106, the end user device 108, the transporter user device 110, the navigation network 112, and the third-party mapping system 114. In some embodiments, there may be a plurality of end user devices and/or a plurality of transporter user devices that are in operative communication with the central server computer 102.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the devices of system 100 in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The central server computer 102 can be a server computer. The central server computer 102 can maintain and operate a platform. The platform can be a delivery platform that delivers items offered by service providers to end users via transporters. Service providers can be enrolled (e.g., onboarded) with the platform in order to provide items to the end users via the transporters. The central server computer 102 can evaluate off-platform service providers to determine candidate service providers. The central server computer 102 can onboard the candidate service provider to become an on-platform service provider.

For example, the service provider may be a restaurant that sells pizza. The central server computer 102 can be operated by a food delivery organization that can aid in the delivery of pizza via transporters to end users that seek to purchase the pizza from the restaurant using the central server computer 102.

The central server computer 102 can facilitate in the fulfillment of fulfillment requests received from the end user device 108. For example, the central server computer 102 can identify one or more transporters operating one or more transporter user devices that are capable of satisfying the fulfillment request. The central server computer 102 can identify the transporter user device 110 that can satisfy the fulfillment request based on any suitable criteria (e.g., transporter location, service provider location, end user destination, end user location, transporter mode of transportation, etc.). The logistics platform 104 may provide real time data regarding locations of the various service providers, transporters, and end users to the central server computer 102.

The logistics platform 104 can include a location determination system, which can determine the location of various user devices such as transporter user devices (e.g., transporter user device 110) and end user devices (e.g., end user device 108). The logistics platform 104 can also include routing logic to efficiently route a transporter using the transport user device 110 to various service providers that have the resources that are to be delivered to the end users. The logistics platform 104 can be part of the central server computer 102 or can be system that is separate from the central server computer 102. In some examples, logistics platform 104 can supplement location information with geographic information from third-party mapping system 114.

The one or more service provider computers 106 may communicate with the central server computer 102 via one or more APIs. The one or more service provider computers 106 may initially present resources such as goods and/or services to end users via an application on the end user device 108. In some embodiments, a service provider has a resource that the end user wants to obtain. In embodiments of the invention, an end user can interact with an interaction application on an end user device to purchase a resource from the service provider.

The one or more service provider computers 106 can include computers operated by service providers. For example, a service provider computer can be a food provider computer that is operated by a food provider. The one or more service provider computers 110 can offer to provide services to the end users of end user devices. The one or more service provider computers 106 can receive requests to prepare one or more items for delivery from the central server computer 102. The one or more service provider computers 106 can initiate the preparation of the one or more items that are to be delivered to the end user of the end user device 108 by a transporter of a transporter user device 110.

The end user device 108 can include a device operated by an end user. The end user device 108 can generate and provide fulfillment request messages to the central server computer 102 to request delivery of an item from a service provider computer to the end user of the end user device 108. The fulfillment request message can indicate that the request (e.g., a request for a service) can be fulfilled by one or more service provider computers 110. For example, the fulfillment request message can be generated based on a cart selected at checkout during a transaction using a central server computer application installed on the end user device 108. The fulfillment request message can include one or more items from the selected cart.

The transporter user device 110 can be a device operated by a transporter. The transporter user device 110 can include smartphones, wearable devices, personal assistant devices, etc. A transporter can request to fulfill an end user's fulfillment request. For example, the transporter user device 110 can generate and transmit a request to fulfill a particular end user's fulfillment request to the central server computer 102. The central server computer 102 can notify the transporter user device 110 of the fulfillment request. The transporter user device 110 can respond to the central server computer 102 with a request to perform the delivery to the end user as indicated by the fulfillment request.

The navigation network 112 can provide navigational directions to the one or more transporter user devices 110. For example, the transporter user device 110 can obtain a location from the central server computer 102. The location can be a service provider parking location, a service provider location, an end user parking location, an end user location, etc. The navigation network 112 can provide navigational data to the location. For example, the navigation network 112 can be a global positioning system that provides location data to the transporter user device 110. In some examples, the navigation network 112 can receive geographic information from the third-party mapping system 114. For example, the navigation network 112 can receive additional geographic information associated with a location of a transporter or a location of an end user.

Figure 2:
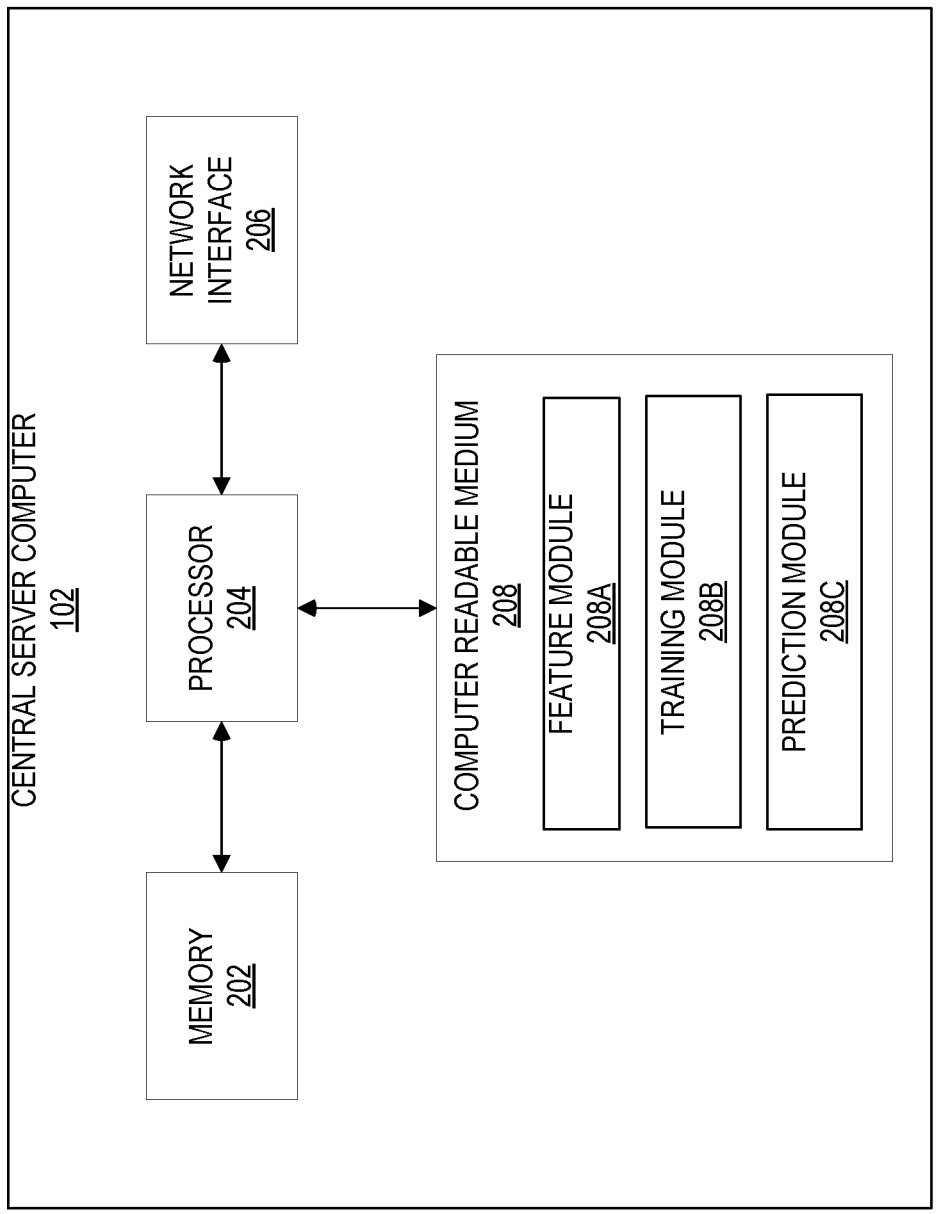
FIG. 2 shows a block diagram of components of a central server computer according to embodiments.

FIG. 2 shows a block diagram of a central server computer 102 according to embodiments. The exemplary central server computer 102 may comprise a processor 204. The processor 204 may be coupled to a memory 202, a network interface 206, and a computer readable medium 208. The computer readable medium 208 can comprise a feature module 208A, a training module 208B, and a prediction module 208C.

The memory 202 can be used to store data and code. For example, the memory 202 can store input data, features, machine learning models, weights, etc. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The computer readable medium 208 may comprise code, executable by the processor 204, for performing a method comprising: receiving, by a server computer, delivery data associated with a plurality of deliveries in a geographical area; determining, by a server computer, a plurality of adverse delivery zones in the geographical area; receiving, by the server computer, a fulfillment request to deliver an item to an end user at a specific location; determining if the specific location is in one of the adverse delivery zones; and if the specific location is in one of the adverse delivery zones, then taking one or more additional actions to ensure that the item is delivered to the end user at the specific location.

The feature module 208A may comprise code or software, executable by the processor 204, for determining and/or evaluating features. The feature module 208A, in conjunction with the processor 204, can extract features from a dataset. Feature extraction can start from an initial set of measured data (e.g., data from the dataset). The feature module 208A, in conjunction with the processor 204, can obtain the dataset from a memory or database. The feature module 208A, in conjunction with the processor 204, can build derived values (e.g., features) from the dataset that can be intended to be informative and non-redundant, facilitating the subsequent learning and generalization steps, and in some cases leading to better human interpretations. Feature extraction can be related to dimensionality reduction of the dataset.

When the input data to an algorithm is too large to be processed and it is suspected to be redundant (e.g., the same measurement in both feet and meters, or the repetitiveness of images presented as pixels), then it can be transformed into a reduced set of features (also named a feature vector). Determining a subset of the initial features is called feature selection. The selected features can contain the relevant information from the input data, so that the desired task (e.g., determining predicted values and predicted ranks) can be performed by using this reduced representation instead of the complete initial data.

The feature module 208A, in conjunction with the processor 204, can perform feature extraction/dimensionality reduction techniques including independent component analysis, creating an isomap, principle component analysis, latent semantic analysis, partial least squares, multifactor dimensionality reduction, nonlinear dimensionality reduction, embedding, autoencoders, etc.

The training module 208B can include may comprise code or software, executable by the processor 204, for training machine learning model(s). The process of training a machine learning model involves providing a machine learning algorithm with training data to learn from. The training module 208B, in conjunction with the processor 204, can input training data into the machine learning model for training. The training data can include labels that indicate the target attribute of the data (e.g., a label indicating a value and rank that the machine learning model is trained to determine).

The training module 208B, in conjunction with the processor 204, can aid the learning algorithm in finding patterns in the training data that map the input data attributes to the target. The training module 208B, in conjunction with the processor 204, can output a trained machine learning model that captures these patterns.

The training module 208B, in conjunction with the processor 204, can further train the trained machine learning model with additional training data that may be obtained after the initial training is complete. The training module 208B, in conjunction with the processor 204, can continuously train the trained machine learning model overtime.

The prediction module 208C can include may comprise code or software, executable by the processor 204, for evaluating data and machine learning model(s). The prediction module 208C, in conjunction with the processor 204, can utilize the trained machine learning model to obtain predictions on new data for which the target (e.g., the predicted value) is unknown. The prediction module 208C, in conjunction with the processor 204, can input end user location data into the trained machine learning model for evaluation. The trained machine learning model can output a prediction of whether that location is in an adverse delivery zone.

The network interface 206 may include an interface that can allow the central server computer 102 to communicate with external computers. The network interface 206 may enable the central server computer 102 to communicate data to and from another device (e.g., the logistics platform 104, the one or more service provider computers 106, the end user device 108, the transporter user device 110, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

In some embodiments, the central server computer 102 may be in operative communication with one or more databases. For example, the central server computer 102 can communicate with a dataset database and/or a features database. The databases may be conventional, fault tolerant, relational, scalable, secure databases such as those commercially available from Oracle™ or Sybase™.

Figure 3:
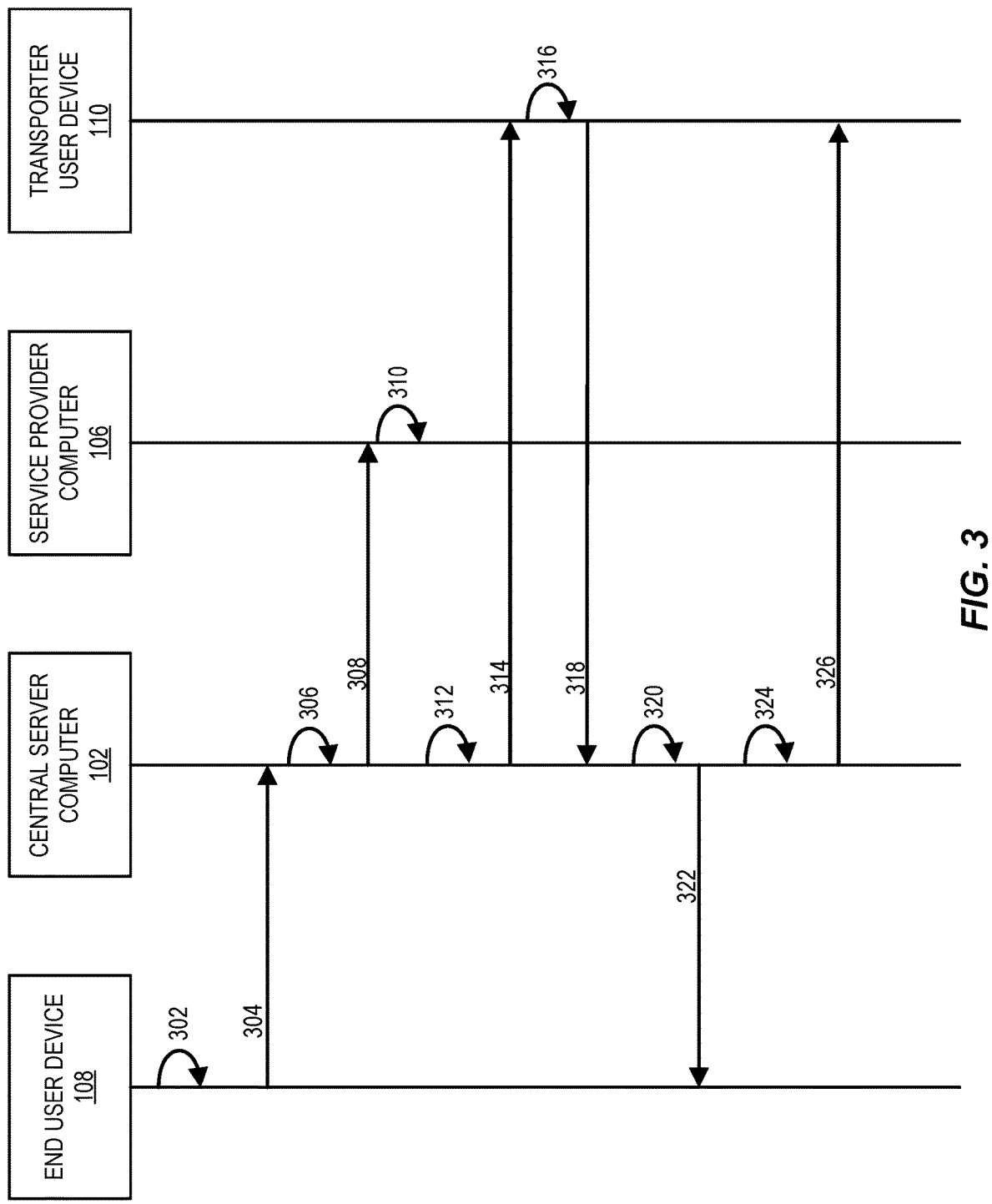
FIG. 3 shows a flow diagram illustrating a method for address verification according to embodiments.

FIG. 3 shows a flow diagram illustrating a method for address verification according to embodiments. The method illustrated in FIG. 3 will be described in the context of the central server computer 102 receiving a fulfillment request message from the end user device 108 to fulfill preparation and delivery of one or more items from a cart to the end user of the end user device 108. The central server computer 102 can communicate with the service provider computer 106 and the transporter user device 110 to fulfill the fulfillment request.

At step 302, the end user device 108 can decide to check out with a cart in a central server computer application installed on the end user device 108. The cart can include one or more items that are provided from a service provider of the service provider computer 106.

At step 304, after checking out with the cart, the end user device 108 can provide a fulfillment request message including the one or more items from the cart to the central server computer 102. The fulfillment request message can also include a service provider computer identifier that identifies the service provider computer 106.

At step 306, after receiving the fulfillment request message, the central server computer 102 can perform a transaction process with the end user device 108. For example, the central server computer 102 can communicate with a payment network to process the transaction for the one or more items. The central server computer 102 can receive an indication of whether or not the transaction is authorized. If the transaction is authorized, then the central server computer 102 can proceed with step 308.

At step 308, the central server computer 102 can provide the fulfillment request message, or a derivation thereof, to the service provider computer 106. The central server computer 102 can determine which service provider computer of a plurality of service provider computers to communicate with based on the service provider indicated in the fulfillment request message. For example, the fulfillment request message can indicate that the one or more items are provided by the service provider of the service provider computer 106. The central server computer 102 can identify the service provider computer 106 using the service provider computer identifier in the fulfillment request message.

At step 310, after receiving the fulfillment request message, the service provider computer 106 can initiate preparation of the one or more items. For example, the service provider computer 106 can alert service providers (e.g., those preparing the items) at the service provider location. The service providers can prepare the one or more items for pick up by a transporter.

At step 312, after providing the fulfillment request message to the service provider computer 106, the central server computer 102 can determine one or more transporters operating one or more user devices that are capable of fulfilling the fulfillment request message. The central server computer 102 can determine the one or more transporters from the transporter user devices. The central server computer 102 can determine the one or more transporter user devices based on whether or not the transporter user device is online, whether or not the transporter user device is already fulfilling a different fulfillment request message, a location of the transporter user device, etc.

At step 314, after determining the one or more transporter user devices, the central server computer 102 can provide the fulfillment request message, or a derivation thereof, to the one or more transporter user devices including the transporter user device 110.

At step 316, after receiving the fulfillment request message, the transporter of the transporter user device 110 can determine whether or not they want to perform the fulfillment. The transporter can decide that they want to perform the delivery of the one or more items from the service provider location to the end user location. The transporter user device 110 can generate an acceptance message that indicates that the fulfillment request is accepted.

At step 318, after generating the acceptance message, the transporter user device 110 can provide the acceptance message to the central server computer 102.

After providing the acceptance message to the central server computer 102, the transporter user device 110 can communicate with the navigation network 116 and the transporter can proceed to the service provider location to obtain the one or more items. The transporter user device 110 can then receive input from the transporter that indicates that the transporter obtained the one or more items (e.g., the transporter selects that they picked up the items). The transporter user device 110 can then communicate with the navigation network 116 and the transporter can then proceed to the end user location to provide the one or more items to the end user. In some embodiments, the transporter user device 110 can provide update messages to the central server computer 102 that include a transporter user device 110 location and/or event data (e.g., items picked up, items delivered, etc.).

In some embodiments, after receiving the acceptance message, the central server computer 102 can notify the other transporter user devices that received the fulfillment request message that the fulfillment request is no longer available.

At step 320, at any point after receiving the acceptance message, the central server computer 102 can check the status of the fulfillment request. For example, the central server computer 102 can determine the location of the transporter user device 110 and can determine an estimated amount of time for the transporter user device 110 to arrive at the end user location.

At step 322, the central server computer 102 can provide a message to the end user device 108 that includes data related to the fulfillment of the fulfillment request message. The data can include an estimated amount of time, the transporter user device location, event data (e.g., items picked up from the service provider), and/or other data related to the fulfillment of the fulfillment request message.

In some embodiments, the central server computer 102 can determine that the end user's location is in an adverse delivery zone. This determination can be made after the central server computer 102 receives the fulfillment request message from the end user device 108 in step 304, but before any items requested by the end user are delivered to the end user by the transporter. In response to a determination, by the central server computer 102, that the end user location is within an adverse delivery zone, a message such as the message in step 322 can include a prompt for the end user to provide additional address or location information to assist the transporter in fulfilling the delivery. In other examples, the message requesting additional information may be sent at any time prior to the completion of the delivery by the transporter.

At step 324, the central server computer 102 can store any data received, sent, and/or processed during the fulfillment of the fulfillment request message into a database. For example, the central server computer 102 can store a user's additional address information as features into a feature database.

At step 326, the central computer server 102 can provide any additional information receive from the end user device 108 to the transporter user device 110. The additional information may be used by the transporter to locate the delivery location specified by the end user.

In some examples, the central computer server 102 may store general information associated with the completed delivery in the feature database. Such information may include an amount of time a transporter was within a predetermined radius of the delivery location, a number of in-app communications between the transporter and end user, location data indicative of movements of the transporter user device within a predetermined radius of the delivery location, or an indication of a failure to deliver to the end user, among others.

FIG. 4 shows an exemplary GUI 400 configured to be displayed by the end user device 108 according to embodiments. The GUI 400 may be displayed in response to a determination, by the central computer server 102, that the end user location is within an adverse delivery zone. The adverse delivery zone may be associated with a geographic area within which there is a rate of delivery failure above a predetermined threshold. The delivery failure data may be received by the central computer server 102 from either or both of the end user device 108 or the transporter device 110.

If the central computer server 102 determines that the end user location falls within an adverse delivery zone, the GUI 400 or a similar GUI may be displayed to the end user via an interface of the end user device 108. The GUI 400 may display the delivery address as input by the end user and may display a text box configured to receive address or location information to supplement the previously provided delivery address. For example, if there is an entry gate at the end user's location and that entry gate requires a passcode, then the end user can enter a message such as "please enter the code 1234 when you arrive at the gate." In another example, if the end user's location is an apartment complex and there is a specific location for deliveries, the end user may enter a message such as "please go to the loading dock area entry at the back of the apartment complex on Main Street and I will meet you there." In yet another example, GUI 400 may prompt the end user to upload a photo of the intended delivery area (e.g., front door of a building, front desk in a lobby of a building, designated curb-side drop-off area, etc.). The photo may then be provided to the transporter to assist the transporter in locating the desired delivery location.

In other examples, GUI 400 may display a selectable list of specific addresses known to be successful delivery points within the adverse delivery zone. For example, a database of computer server 102 may store delivery and address information such as whether one or more deliveries are successfully completed for a given address. If these addresses associated with successful deliveries are within a predetermined radius of the user-provided address, the GUI 400 may provide them as suggested addresses to the user. Alternatively, or additionally, the GUI 400 may display suggested addresses associated with previous successful deliveries to the end user.

In yet other embodiments, the central server computer 102 can use machine learning to predict a type of potential delivery problem at a particular location and can provide the end user with a specific prompt rather than an open ended prompt. For example, if the central server computer determines that transporters delivering items to a particular address are driving vehicles for a long time near the address before the transport exits their vehicle and physically delivers a requested item, then this may indicate that the particular address does not have a good or easily recognizable temporary parking location. A predicted prompt to the end user in the GUI may be something like: "It appears that parking may be difficult for transporters at your address. Please confirm that the curb near the side of your apartment building on Main street is the best place to meet your transporter to receive your item." The user can then confirm either "yes" or "no" or can provide a different input.

In some examples, the central computer server 102 may communicate with the third-party mapping system 114 to determine whether an address is associated with a multi-unit building, e.g., an apartment complex, gated community, condo building, campus, etc. Based on this determination, GUI 400 may prompt the end user to provide specific additional information such as a unit number, building name, or drop-off location such as a building's front desk.

Information received by the central computer server 102 via GUI 400 may be stored in a database associated with the central computer server 102, such as a feature database. As an example, a feature database may store information indicative of a number of times users have been prompted for additional location information or of a number of times additional information has been provided for a particular address or group of addresses (e.g., addresses associated with a building or campus).

Figure 5:
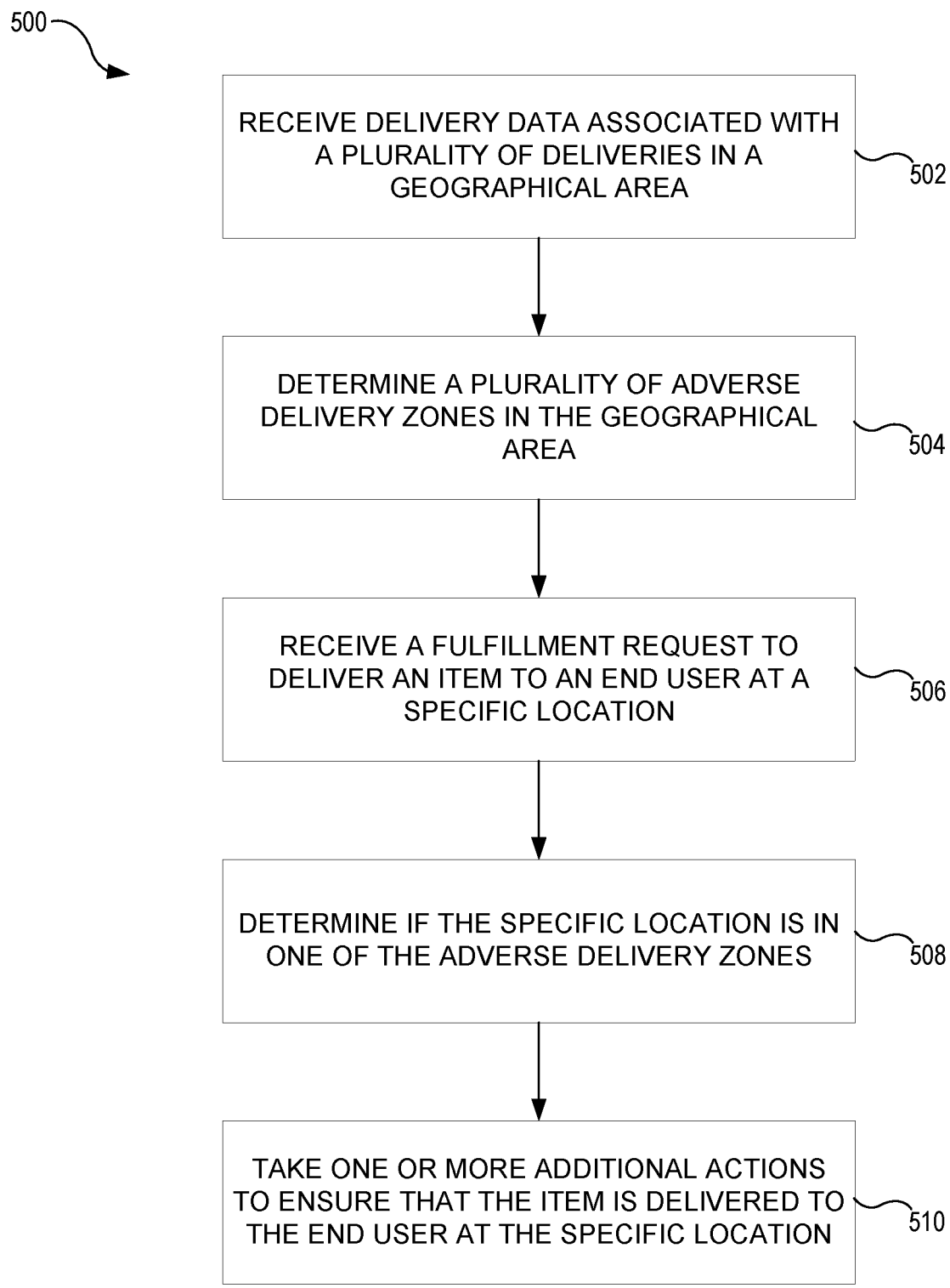
FIG. 5 shows a flow diagram of an address verification method according to embodiments.

FIG. 5 shows a flow diagram of a method 500 for address verification according to embodiments. The method illustrated in FIG. 5 will be described in the context of a central server computer training a machine learning model, evaluating a specific location provided by an end user using the machine learning model, and taking one or more actions based on outputs from the machine learning model. It is understood, however, that the invention can be applied to other circumstances.

At step 502, the central server computer can receive delivery data associated with a one or more deliveries in a geographical area. In some examples, the delivery data may include an address, ambiguous address, or incomplete address associated with the one or more deliveries. Delivery data can further include data associated with a success/failure of a delivery, length of time a transporter spent within a predefined distance from a delivery location, number of communications between a transporter and end user, or location information indicative of movements of the transporter user device within a predetermined area of the delivery location.

At step 504, the central server computer can determine adverse delivery zones in the geographical area. For example, adverse delivery zones may be determined by the central server computer using a machine learning model.

In some examples, to determine an adverse deliver zone, the central server computer can obtain data from one or more transporter user devices or end user devices. This data may be supplemented by geographic information provided by a third-party mapping system. The central server computer may include the data from the one or more transporter user devices/end user devices into a dataset. The central server computer may extract one or more features from the dataset. Features may include, for example, information regarding the amounts of times that transporters spend at locations where they are supposed to deliver items to end users. Other features may include a measure of the randomness of a path taken by a transporter to a delivery location of the end user. For example, if the central server computer determines that transporters that deliver items to a particular address have a wide variance and randomness to the paths that they take to delivery and item and exit the address, this may indicate that the address is associated with an office complex (with different building with different mailing addresses) that has confusing pathways or paths or building that are not well marked. The random and varying paths of the transporters attempting to deliver to that address may be indicative of the transporters spending time walking around the complex trying to find the exact delivery address. Other features may include data indicating that transporters are driving vehicles for a long time near the address. This may indicate that the particular address does not have a good or easily recognizable temporary parking location.

In another example, addresses or delivery zones may be determined based on a rate of failed deliveries, number of refunds, or number of end user or transporter user cancellations at that address or within that delivery zone. In some examples, the addresses or delivery zones may be ranked based on one or more of the above metrics and a percentage of these addresses or zones may be considered adverse (e.g., the five percent of delivery zones having the greatest number of refunds issued).

In another example, the central server computer may determine, for a delivery address or delivery zone, a measure of the risk of a delivery being never delivered (ND). An ND delivery can occur when an end user reports that he did not receive a delivery despite the transporter user indicating the delivery was completed. ND deliveries result in a decreased end user and transporter experience. Accordingly, the central server computer may determine an ND risk for an address or geographic area to determine whether the address or geographic area is an adverse delivery zone (e.g., when the ND risk or average ND risk of addresses in the delivery zone is above a given threshold value.

The central computer server may then train a machine learning model using training data that is based on the features and determine adverse delivery zones using the trained machine learning model. In another example, the central computer server may continuously or periodically receive delivery data and update the training data set. The updated training data set may be used to generate an updated machine learning model, which may be used to determine updated adverse delivery zones.

As an example, a new building may be open to new residents. However, geographic and/or address information associated with the new building may not be available to the central server computer via a third-party mapping service. The address of the new building may be associated with an adverse delivery zone as the navigational network may have difficulty in generating directions to the new building since there is no available specific delivery instruction data associated with the address in the third-party mapping system. As time progresses, the number of successful deliveries to the building may increase due to additional information provided by end users in the building, which is stored by the central server computer. For example, the new building may have a small temporary parking zone near its entrance and deliveries would be delivered more quickly to users in a loading dock area which has a larger temporary parking area. Various end users that have had deliveries to the building may have provided information to transporters (via the central server computer) to deliver items to the loading dock area instead of the front of the building. In future deliveries, the central server computer, using this information, the central server computer can automatically provide a suggestion to the end users to meet at the locating dock instead of at the front of the building, and the end users can confirm this suggestion, thereby resulting in faster deliveries. As the success rate of deliveries to addresses associated with the building increases, the machine learning model will update such that addresses associated with the new building are no longer within an adverse delivery zones.

In this example, the central server computer can also store the additional information to compile a database of supplementary address information associated with the building or adverse delivery zone. This supplementary information may be automatically retrieved and provided to an end user for confirmation or directly to the transporter when an end user specifies a delivery location within the adverse delivery zone.

In some examples, the central server computer may perform one or more additional steps associated with generating and managing the machine learning model, such as data cleaning, feature generation and management, and model maintenance.

At step 506, the central server computer may receive a fulfillment request to deliver an item to an end user at a specific location, e.g., a delivery location. In some examples, the delivery data may include an address, ambiguous address, or incomplete address provided by an end user or automatically by an end user device.

In some examples, the input address may be associated with a degree of difficulty or an ND risk. For example, the degree of difficulty of an address may be a metric based on a median time within a geofence associated with the address within which transporter users spend time when delivering to that address as compared to other addresses in a submarket of the address. In other examples, a degree of difficulty may be based on an amount of time indicative of the lateness of a delivery (e.g., deliveries to a particular address are, on average, twenty minutes late as compared to an estimated delivery completion time). In some examples, the degree of difficulty may be determined by using delivery data associated with deliveries of trusted transporter users. A trusted transporter user may be a transporter user associated with a threshold percentage of successfully completed deliveries, a number of successfully completed deliveries, an average delivery rating, an amount of time spent as a transporter user, or a threshold percentage of successful deliveries to difficult addresses or within adverse delivery zones. A submarket associated with an address can be a portion of a larger market (e.g., a city or metropolitan area). The submarket may be a smaller defined area within a market (e.g., a ward, a district, or a neighborhood), or may be defined by a characteristic such as an average household income, zoning type, or other socioeconomic feature. In another example, the submarket may be a logistically related geographic area, i.e., a geographic area within which deliveries could occur. Thus, the central server computer may determine a degree of difficulty for an address provided by the end user.

At step 508, the central server computer can determine if the specific location is in one of the adverse delivery zones. For example, the central server computer may retrieve adverse delivery zone information generated by the machine learning model and determine whether the specific location falls within a boundary of the delivery zone. In another example, the central server computer may use delivery and geographic data as described above to predict a degree of difficulty associated with the delivery address using a machine learning model trained on historic delivery data.

At step 510, if the specific location is in one of the adverse delivery zones, then the central server computer can take one or more additional actions to ensure that the item is delivered to the end user at the specific location. In another example, the action may be based on the degree of difficulty determined for the delivery address being above a threshold value. Additional actions may include querying a database to retrieve previously received location information associated with an end user or specific location or prompting the end user, via the end user device, to provide additional location information to assist the transporter in successfully completing the delivery. The additional information can be stored by the central server computer and transmitted to the transporter user device.

As another example, the additional action may include providing the fulfilment request to a trusted transporter or set of trusted transporters. For example, as described with reference to FIG. 3, at step 312, the central server computer may determine a set of trusted transporters to which to provide the opportunity to accept the fulfillment request. The trusted transporters may have a rate of successfully completed deliveries above a certain threshold. In another example, trusted transporters may be those associated with a particular rate of success to addresses having a degree of difficulty above a threshold. Accordingly, the central server computer may determine an address indicated in a fulfillment request is difficult to deliver to and may determine a set of trusted transporters who have a greater chance of success in delivering to a difficult address.

In order to address adverse delivery zones, which decrease the satisfaction of both the end users and the transporters, the central server computer can obtain datasets, train a machine learning model using the datasets, and utilize the machine learning model to determine adverse delivery zones and trigger mitigating actions to ensure successful delivery to a location within an adverse delivery zone. The machine learning model can be trained to understand what indicates that an address or area is difficult to deliver to and what type of information enables successful deliveries to such locations. This process improves delivery times and improves navigational instructions provided to a transporter user.

Figure 6:
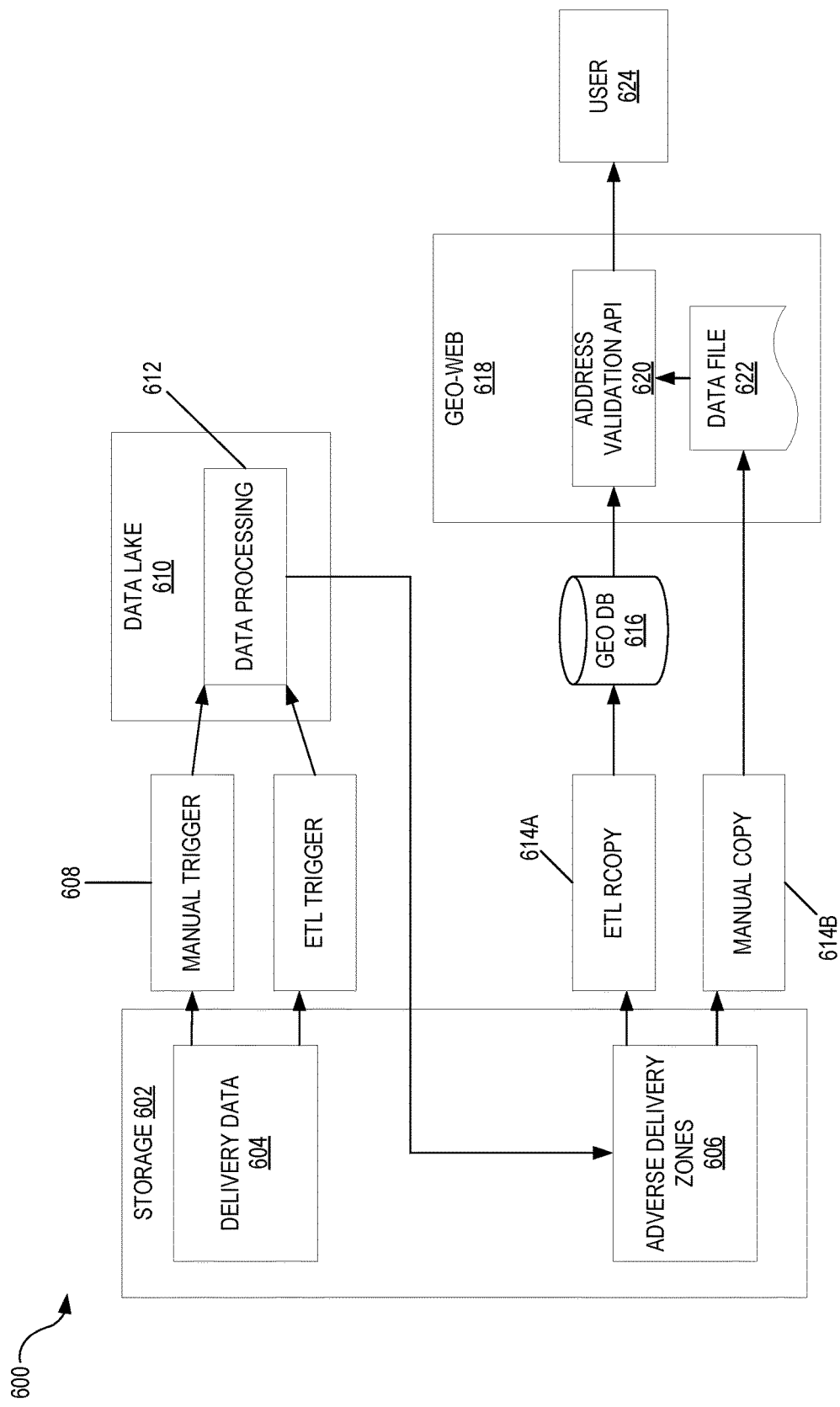
FIG. 6 shows a block diagram illustrating a system for generating adverse delivery zones according to embodiments.

FIG. 6 shows a flow diagram of a process 600 for address verification according to embodiments. The process illustrated in FIG. 6 will be described in the context of a central server computer receiving specific location information from an end user. It is understood, however, that the invention can be applied to other circumstances (e.g., receiving a request for additional location information from a transporter, etc.)

FIG. 6 includes storage 602 that can store a dataset 604 and adverse delivery zones 606, which will be discussed in further detail below. The dataset 604 can include data associated with past or on-going deliveries and may be received from service provider systems, end user devices, and transporter user devices. In some examples, storage 602 may be a cloud-based storage system, such as Snowflake or Amazon Simple Storage Service (S3).

The dataset 604 can include data from an external data source, such as a third-party mapping system. For example, the central server computer can obtain third-party data such as geographic, navigational, and building data. In one example, the central server computer may determine location coordinates, e.g., a latitude and a longitude, for a given address and map the location coordinates to those on a map stored by the third-party mapping system. In another example, the central server computer may map a given address, in whole or in part, to an address stored by the third-party mapping system. Accordingly, addresses and locations in dataset 604 may be mapped to a geographical map of the third-party mapping system. A third-party mapping system may be a website or cloud-based storage system providing geographic information (e.g., Google Maps, Apple Maps, etc.).

At block 606, the process 600 to generate adverse delivery zones may be triggered manually or may be triggered as an extract, load, transform (ETL) job. For example, the process to generate/update adverse delivery zones may be scheduled to run at predetermined intervals or in response to predetermined events, such as a rate of unsuccessful deliveries within a geographic area exceeding a threshold. Once the process 600 is triggered, dataset 604 may be transferred to a data lake 610 for further processing.

At block 612, the dataset 604 can be processed using a web-based platform such as Databricks. Data processing may include bucketing addresses contained in dataset 604 based on geographic area. In some examples, a delivery zone associated with an address may be defined by a boundary in which the location coordinates of the address are the center. As an example, the central server computer may determine a set of location coordinates comprising a latitude and a longitude for a delivery address and determine a boundary function, where the boundary function defines a delivery zone. In some examples, the boundary function may define a geometric shape, such as a hexagon, having the set of location coordinates as a center point. In other examples, the boundary function may define a polygon or other closed shape. In another example, the boundary function may define any closed boundary.

In some examples, data processing may include aggregating data into hexagonal zones. Each hexagon may be associated with parameters such as: hexagon ID; hexagon resolution; number of deliveries to addresses in the hexagon; number of failed deliveries in the hexagon; and percentage of failed deliveries in the hexagon.

Data processing can further include filtering the aggregated data to identify hexagons associated with high delivery failure rates. This can be accomplished by, for example, blurring delivery and delivery failure values across hexagon boundaries to ensure that hexagon boundaries, which are arbitrary, do not interfere with identifying hotspots. The blurring process may be based on, for example, Gaussian blur. The hexagons may be further filtered by delivery count to avoid cases in which a hexagon has one attempted delivery and one failed delivery, resulting in a failed delivery rate of 100%.

The filtered hexagons may be ranked by failed delivery rate, or ND risk, such that hexagons having a failed delivery rate or ND risk level above a predetermined threshold are designated as adverse delivery zones. In some examples, other parameters may be used in addition to or instead of failed delivery rate to determine adverse delivery zones. The adverse delivery zones 606 may be stored in storage 612 or in another database.

At step 614A, a process may be triggered as an ETL job to copy the adverse delivery zone data to a Geo DB 616. For example, adverse delivery zone data may be copied to Geo DB 616 periodically at predefined intervals, or upon a triggering event. Adverse delivery zone data 606 may be available to a user 624 via an address verification API 620. Accordingly, when a user, e.g., central server computer 102, receives a fulfilment request associated with a specific location, the central server computer may retrieve adverse delivery zone data via API 620. In another example, at step 614B, adverse delivery zone data 606 may be transferred manually to a data file 622 that is accessible to the user 624 via API 620.

In some examples, process 600 may be executed at predetermined intervals to account for updates to third-party mapping data or to increased delivery success resulting from requested and stored delivery instructions.

Figure 7:
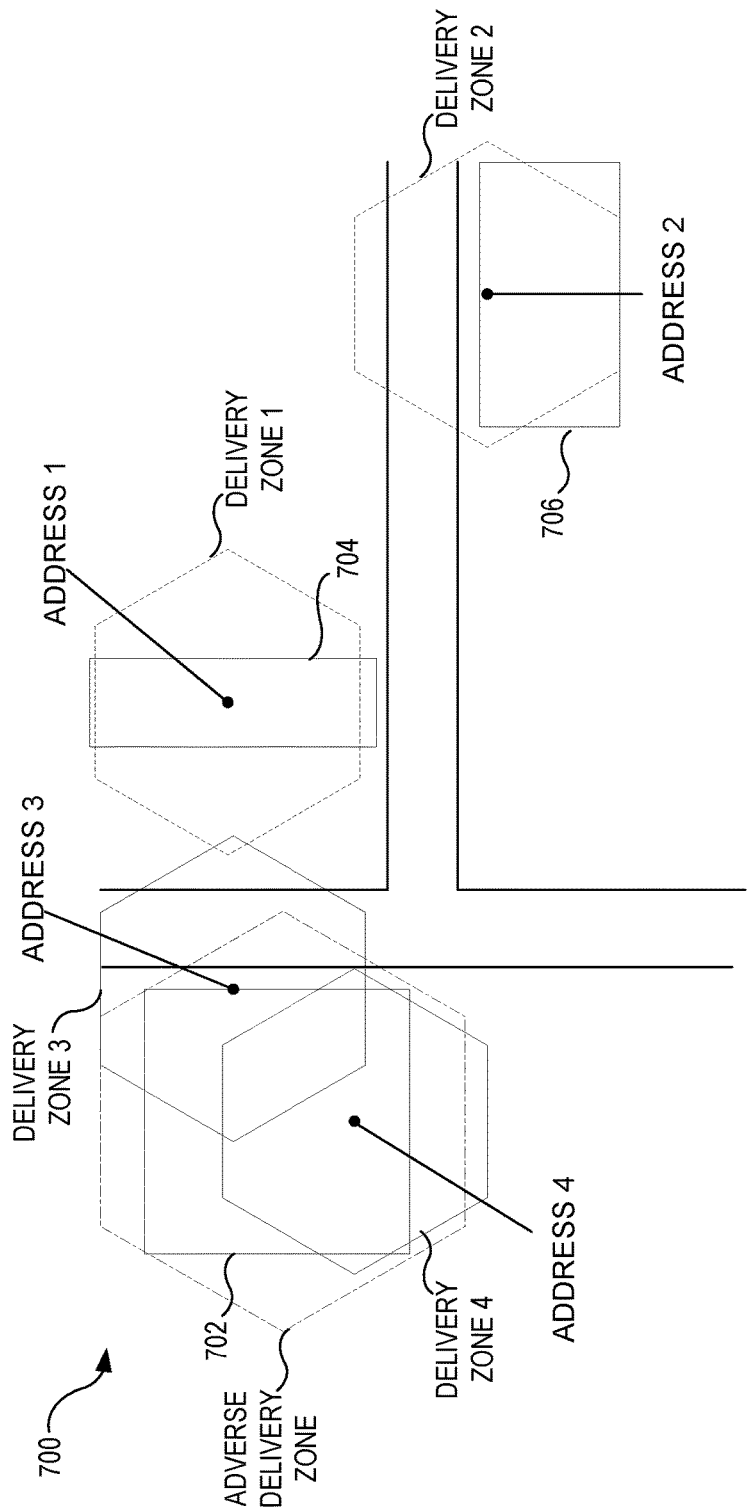
FIG. 7 shows an illustration of a map displaying adverse delivery zones according to embodiments.

FIG. 7 provides an exemplary illustration of a map 700 depicting generated hexagons associated with delivery zones. For example, map 700 may be generated via one or more of the processes described above. Map 700 may include data associated with a number of buildings: building 702, building 704, and building 706. each building may be associated with an address. For example, building 702 may be associated with Address 3 and Address 4 (e.g., building 702 may be a multi-unit building). Buildings 704 and 706 may be single-family homes and may be associated with Address 1 and Address 2, respectively.

For each address, the central server computer may determine a boundary function defining a delivery zone where the address, or a set of location coordinates associated with the address is the center. Using the process described above with reference to FIG. 6, the central computer server may determine a failed delivery rate associated with each delivery zone. Delivery zones 1 and 2 may have relatively low failed delivery rates as the addresses of the central server computer database map to single-family homes where there is likely little confusion regarding where to delivery an order. However, Delivery zones 3 and 4 may be associated with failed delivery rates above a given threshold. As an example, end users of building 702 may fail to include a unit number on deliveries, or building 702 may be difficult for the transporter user to navigate.

Using the bucketing technique described above, an adverse delivery zone may be generated based on delivery zones 3 and 4, such that the adverse delivery zone encompasses building 702. Thus, when an end user submits a fulfilment request having a delivery location within building 702, the central server computer may determine that the delivery location is within the adverse delivery zone and may transmit a prompt to the end user device for the end user to provide additional location information.

Embodiments of the disclosure have a number of technical advantages. For example, the central server computer determine whether a delivery address is within an adverse delivery zone and take a mitigating action, such as requesting additional information from the end user, or by providing stored location information and providing it to the transporter user. Systems and methods described above improve the delivery process for both the end user and transporter user by improving delivery speed and accuracy. This results in a greater number of successful deliveries, ability for a transporter user to complete more orders in a period of time, and improved satisfaction with the service provider.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

All patents, patent applications, publications, and descriptions mentioned above are herein incorporated by reference in their entirety for all purposes. None is admitted to be prior art.

What is claimed is:

1. A method comprising:
   receiving, by a server computer, delivery data associated with a plurality of deliveries in a geographical area;
   based on the delivery data, determining, by the server computer using a machine learning model, a set of adverse delivery zones in the geographical area, each of the set of adverse delivery zones being associated with an error and being located within a geofence, wherein the set of adverse delivery zones is predicted by the machine learning model;
   storing, by the server computer, a collection of adverse delivery zones comprising the set of adverse delivery zones in a storage;
   receiving, by the server computer, a fulfillment request to deliver an item associated with a service provider to an end user at a specific physical location;
   determining, by the server computer, that a delivery zone corresponding to the specific physical location is within an adverse delivery zone of the collection of adverse delivery zones;
   in response to the determining that the specific physical location is within the adverse delivery zone, executing, by the server computer, an action for resolving the error, the action including prompting, by the server computer, an end user device to display a graphical user interface for receiving an input of additional information associated with the specific physical location, wherein the end user device displays the graphical user interface and receives the input of the additional information via a user input;
   receiving, by the server computer from the end user device, electronic signals corresponding to the additional information input through the graphical user interface displayed on the end user device;
   determining, by the server computer, an autonomous vehicle for delivering the item;
   providing, by the server computer to the autonomous vehicle, data related to the fulfillment request, to cause the autonomous vehicle to travel to a location of the service provider to retrieve the item and then to the specific physical location to deliver the item, wherein the server computer communicates with the autonomous vehicle via a network interface by sending and receiving electronic signals;
   providing, by the server computer, via the network interface, to the autonomous vehicle using a global positioning system (GPS), navigational directions to route the autonomous vehicle to the location of the service provider and the specific physical location, the navigational directions including the additional information corresponding to the electronic signals received from the end user device, wherein the autonomous vehicle thereafter receives the navigational directions including the additional information associated with the specific physical location and delivers the item to the specific physical location;
   receiving, by the server computer via the network interface from the autonomous vehicle, updated delivery data associated with at least the delivery of the item to the specific physical location;
   training, by the server computer, the machine learning model using the updated delivery data to provide a prediction whether a certain location is within an updated set of adverse delivery zones, the training comprising modifying values for a set of parameters to obtain the set of parameters with optimized values;
   generating, by the server computer, an updated machine learning model having the set of parameters with optimized values, wherein the updated machine learning model is configured to, based on a location data provided as an input, output a prediction of whether a location corresponding to the location data is within the updated set of adverse delivery zones;
   determining, by the server computer using the updated machine learning model, the updated set of adverse delivery zones in the geographical area;
   updating, by the server computer, the collection of adverse delivery zones, by storing the updated set of adverse delivery zones in the storage, the updated collection of adverse delivery zones does not include the delivery zone for the specific physical location, wherein the delivery zone for the specific physical location was predicted by the machine learning model as the adverse delivery zone prior to the machine learning model being updated; and
   storing, by the server computer, the additional information associated with the specific physical location in a database for automatically providing the navigational directions including the additional information to autonomous vehicles to reach the specific physical location.

2. The method of claim 1, wherein the server computer determines the set of adverse delivery zones using information regarding amounts of time that one or more autonomous vehicles spend at locations where they are supposed to deliver items to end users.

3. The method of claim 1, further comprising:
   obtaining, by the server computer, data from one or more autonomous vehicles;
   including, by the server computer, the data from the one or more autonomous vehicles into a dataset;
   extracting, by the server computer, a plurality of features from the dataset; and
   training, by the server computer, the machine learning model based on the plurality of features, to generate the updated machine learning model.

4. The method of claim 1, wherein the delivery data comprises delivery addresses and wherein the method further comprises:
  determining, by the server computer, a set of location coordinates comprising a latitude and a longitude for each delivery address; and
  for each set of location coordinates, determining, by the server computer, a boundary function, wherein the boundary function defines a specific adverse delivery zone.

5. The method of claim 4, wherein, for each set of location coordinates,
  the boundary function defines a hexagon having the set of location coordinates as a center point.

6. The method of claim 1, wherein the server computer determines the set of adverse delivery zones using a failure rate associated with one or more delivery addresses within each adverse delivery zone.

7. The method of claim 1, wherein the server computer determines the set of adverse delivery zones using transporter movement data generated within a threshold distance from the specific physical location.

8. The method of claim 1, wherein the providing, to the autonomous vehicle, the data related to the fulfillment request further includes:
  providing, to the autonomous vehicle, a message comprising an instruction to travel to the location of the service provider to retrieve the item and then to the specific physical location to deliver the item.

9. A server computer comprising:
  a processor; and
  a computer-readable medium coupled to the processor, the computer-readable medium comprising code executable by the processor for implementing a method including:
    receiving delivery data associated with a plurality of deliveries in a geographical area;
    based on the delivery data, determining, using a machine learning model, a set of adverse delivery zones in the geographical area, each of the set of adverse delivery zones being associated with an error and being located within a geofence, wherein the set of adverse delivery zones is predicted by the machine learning model;
    storing a collection of adverse delivery zones comprising the set of adverse delivery zones in a storage;
    receiving a fulfillment request to deliver an item associated with a service provider to an end user at a specific physical location;
    determining that a delivery zone corresponding to the specific physical location is within an adverse delivery zone of the collection of adverse delivery zones;
    in response to the determining that the specific physical location is within the adverse delivery zone, executing an action for resolving the error, the action including prompting an end user device to display a graphical user interface for receiving an input of additional information associated with the specific physical location, wherein the end user device displays the graphical user interface and receives the input of the additional information via a user input;
    receiving, from the end user device, electronic signals corresponding to the additional information input through the graphical user interface displayed on the end user device;
    determining an autonomous vehicle for delivering the item;
    providing, to the autonomous vehicle, data related to the fulfillment request, to cause the autonomous vehicle to travel to a location of the service provider to retrieve the item and then to the specific physical location to deliver the item, wherein the server computer communicates with the autonomous vehicle via a network interface by sending and receiving electronic signals;
    providing, via the network interface, to the autonomous vehicle using a global positioning system (GPS), navigational directions to route the autonomous vehicle to the location of the service provider and the specific physical location, the navigational directions including the additional information corresponding to the electronic signals received from the end user device, wherein the autonomous vehicle thereafter receives the navigational directions including the additional information associated with the specific physical location and delivers the item to the specific physical location;
    receiving, via the network interface from the autonomous vehicle, updated delivery data associated with at least the delivery of the item to the specific physical location;
    training the machine learning model using the updated delivery data to provide a prediction whether a certain location is within an updated set of adverse delivery zones, the training including modifying values for a set of parameters to obtain the set of parameters with optimized values;
    generating an updated machine learning model having the set of parameters with optimized values, wherein the updated machine learning model is configured to, based on a location data provided as an input, output a prediction of whether a location corresponding to the location data is within the updated set of adverse delivery zones;
    determining, using the updated machine learning model, the updated set of adverse delivery zones in the geographical area;
    updating the collection of adverse delivery zones, by storing the updated set of adverse delivery zones in the storage, the updated collection of adverse delivery zones does not include the delivery zone for the specific physical location, wherein the delivery zone for the specific physical location was predicted by the machine learning model as the adverse delivery zone prior to the machine learning model being updated; and
    storing the additional information associated with the specific physical location in a database for automatically providing the navigational directions including the additional information to autonomous vehicles to reach the specific physical location.

10. The server computer of claim 9, wherein determining the set of adverse delivery zones includes using information regarding amounts of time that one or more autonomous vehicles spend at locations where they are supposed to deliver items to end consumers.

11. The server computer of claim 9, wherein determining the set of adverse delivery zones further includes:
  obtaining data from one or more autonomous vehicles;
  including the data from the one or more autonomous vehicles into a dataset;
  extracting a plurality of features from the dataset; and
  training the machine learning model based on the plurality of features.

12. The server computer of claim 9, wherein the delivery data comprises delivery addresses and wherein the determining the set of adverse delivery zones further includes:
    determining a set of location coordinates comprising a latitude and a longitude for each delivery address; and
    for each set of location coordinates, determining a boundary function, wherein the boundary function defines a specific adverse delivery zone.

13. The server computer of claim 12, wherein, for each set of location coordinates, the boundary function describes a hexagon having the set of location coordinates as a center point.

14. A system comprising:
    an autonomous vehicle;
    an end user device; and
    a server computer comprising a computer-readable medium coupled to a processor, the computer-readable medium comprising code executable by the processor for implementing a method including:
        receiving delivery data associated with a plurality of deliveries in a geographical area;
        based on the delivery data, determining, using a machine learning model, a set of adverse delivery zones in the geographical area, each of the set of adverse delivery zones being associated with an error and being located within a geofence, wherein the set of adverse delivery zones is predicted by the machine learning model;
        storing a collection of adverse delivery zones comprising the set of adverse delivery zones in a storage;
        receiving, from the end user device, a fulfillment request to deliver an item associated with a service provider to an end user at a specific physical location;
        providing the fulfillment request to the autonomous vehicle;
        receiving an acceptance message from a the autonomous vehicle;
        determining that a delivery zone corresponding to the specific physical location is within an adverse delivery zone of the collection of adverse delivery zones;
        in response to the determining that the specific physical location is within the adverse delivery zone, executing an action for resolving the error, the action including prompting the end user device to display a graphical user interface for receiving an input of additional information associated with the specific physical location, wherein the end user device displays the graphical user interface and receives the input of the additional information via a user input;
        receiving, from the end user device, electronic signals corresponding to the additional information input through the graphical user interface displayed on the end user device;
        providing, to the autonomous vehicle, data related to the fulfillment request, to cause the autonomous vehicle to travel to a location of the service provider to retrieve the item and then to the specific physical location to deliver the item, wherein the server computer communicates with the autonomous vehicle via a network interface by sending and receiving electronic signals;
        providing, via the network interface, to the autonomous vehicle using a global positioning system (GPS), navigational directions to route the autonomous vehicle to the location of the service provider and the specific physical location, the navigational directions including the additional information corresponding to the electronic signals received from the end user device, wherein the autonomous vehicle thereafter receives the navigational directions including the additional information associated with the specific physical location and delivers the item to the specific physical location;
        receiving, via the network interface from the autonomous vehicle, updated delivery data associated with at least the delivery of the item to the specific physical location;
        training the machine learning model using the updated delivery data to provide a prediction whether a certain location is within an updated set of adverse delivery zones, the training including modifying values for a set of parameters to obtain the set of parameters with optimized values;
        generating an updated machine learning model having the set of parameters with optimized values, wherein the updated machine learning model is configured to, based on a location data provided as an input, output a prediction of whether a location corresponding to the location data is within the updated set of adverse delivery zones;
        determining, using the updated machine learning model, the updated set of adverse delivery zones in the geographical area;
        updating the collection of adverse delivery zones, by storing the updated set of adverse delivery zones in the storage, the updated collection of adverse delivery zones does not include the delivery zone for the specific physical location, wherein the delivery zone for the specific physical location was predicted by the machine learning model as the adverse delivery zone prior to the machine learning model being updated; and
        storing the additional information associated with the specific physical location in a database for automatically providing the navigational directions including the additional information to autonomous vehicles to reach the specific physical location.

* * * * *